United States Patent
Drutchas et al.

[15] 3,675,422
[45] July 11, 1972

[54] FULL POWER BRAKING SYSTEM WITH SKID CONTROL AND REDUNDANT POWER STEERING

[72] Inventors: Gilbert H. Drutchas; Hubert M. Clark, both of Birmingham, Mich.

[73] Assignee: TRW Inc., Cleveland, Ohio

[22] Filed: Feb. 9, 1971

[21] Appl. No.: 114,006

[52] U.S. Cl. ..................60/54.5 P, 60/54.5 F, 60/52 B, 60/52 S, 303/21 F
[51] Int. Cl. ..................................................F15b 7/00
[58] Field of Search..............60/54.5 P, 54.6 P, 54.6 E, 60/54.5 E, 52 S, 52 B; 303/21 F

[56] References Cited

UNITED STATES PATENTS

| 3,184,921 | 5/1965  | Allen........................60/54.6 P |
| 3,308,620 | 3/1967  | Melinat......................60/54.5 E |
| 3,330,113 | 7/1967  | Perrino......................60/54.5 P |
| 3,539,227 | 11/1970 | Drutchas et al. .............303/21 F |

*Primary Examiner*—Edgar W. Geoghegan
*Attorney*—Hill, Sherman, Meroni, Gross & Simpson

[57] ABSTRACT

Skid control and conventional braking functions are integrated in a single assembly while providing power means through the use of an auxiliary power source, the power steering pump, for braking modes where the main source of power braking, the skid control pump, is unable to provide the required power. In the event of failure, the power steering pump is available for braking and, vice versa, the skid control pump is available for power steering.

12 Claims, 11 Drawing Figures

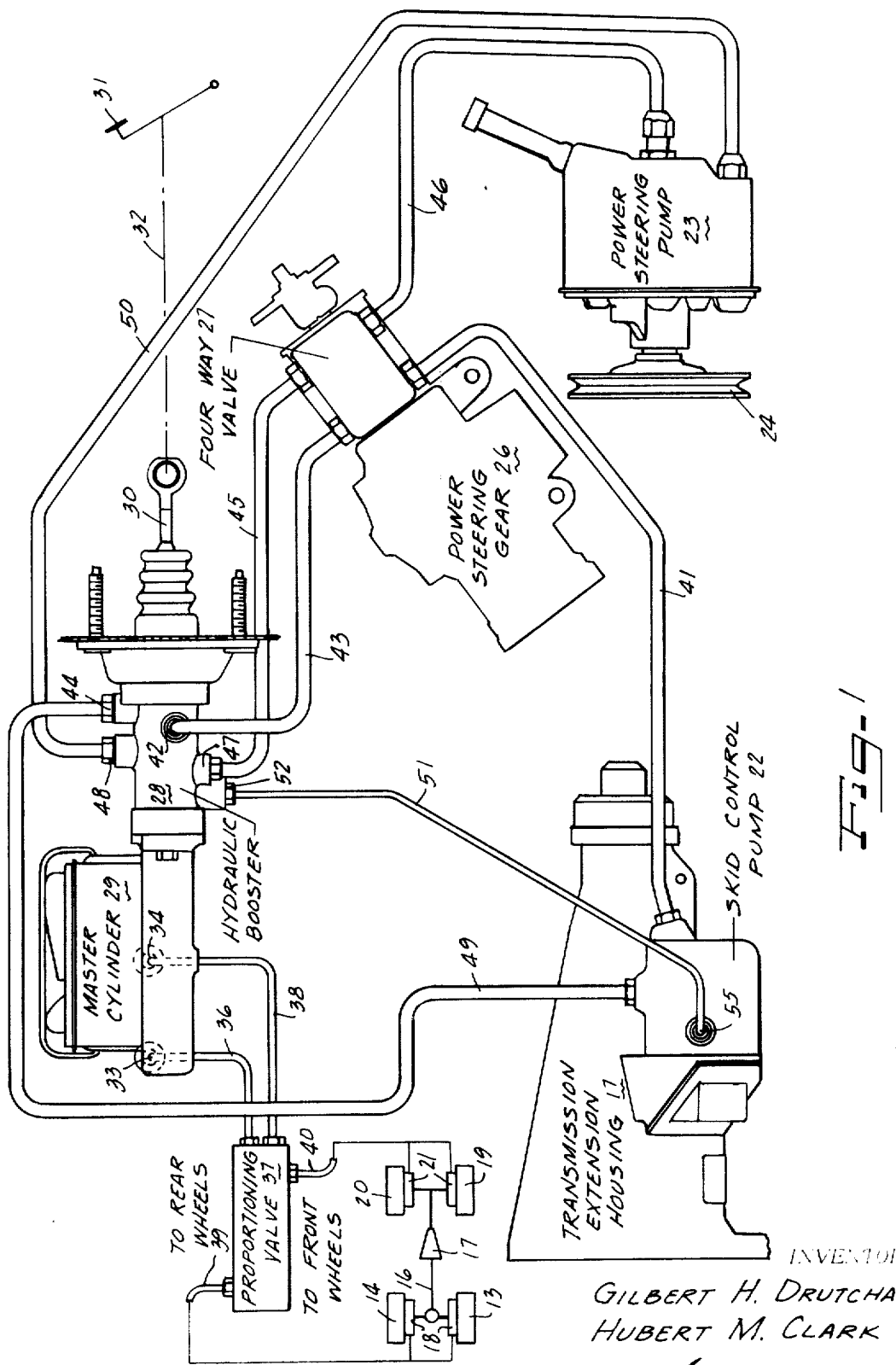

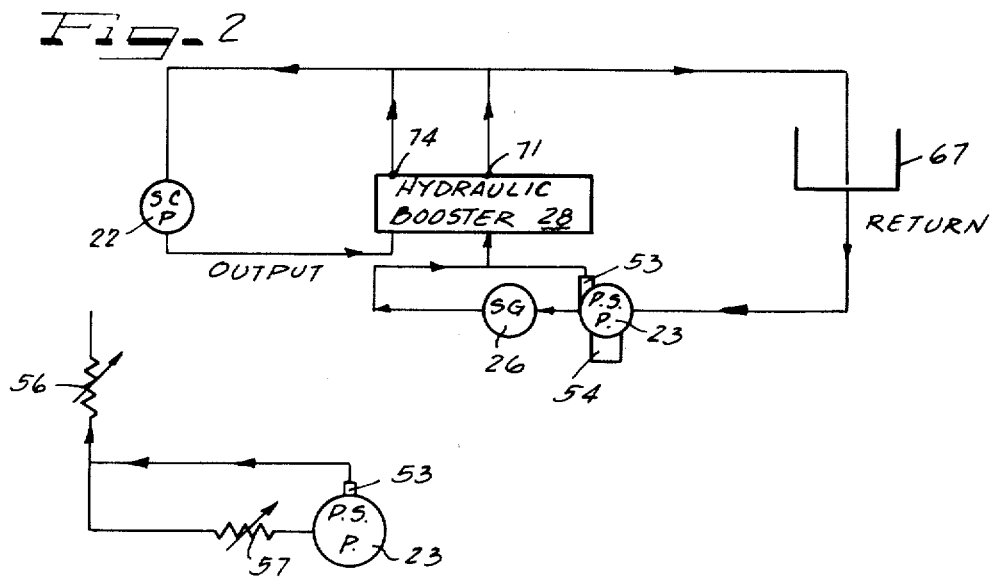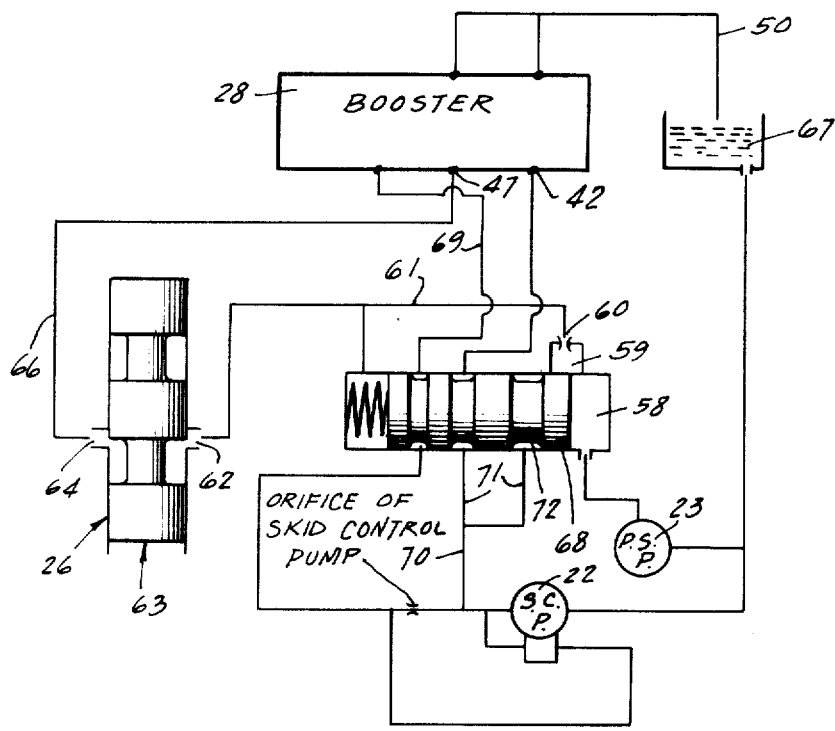

INVENTORS
GILBERT H. DRUTCHAS
HUBERT M. CLARK

BY *Hill, Sherman, Meroni, Gross & Simpson*

ATTORNEYS

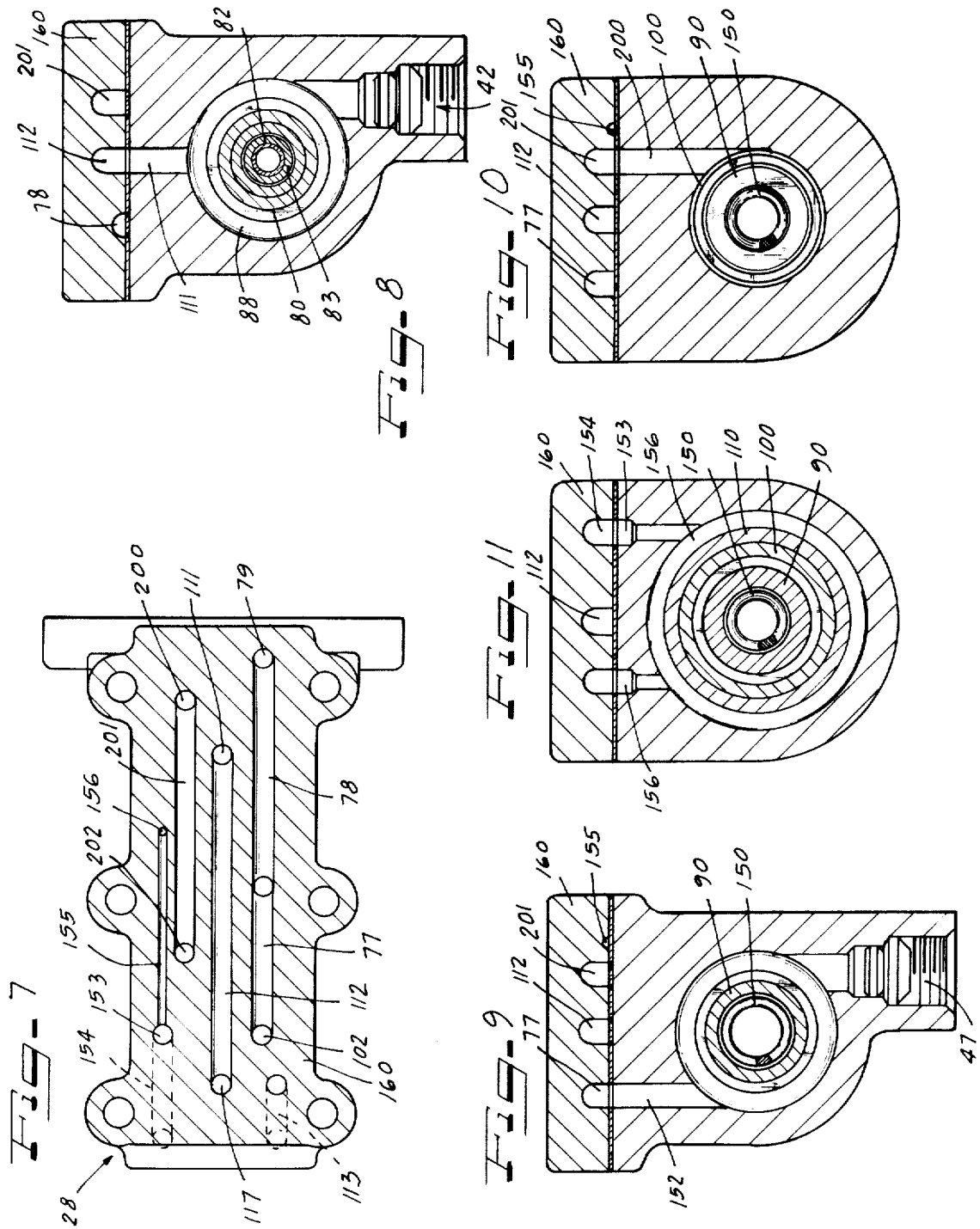

3,675,422

FULL POWER BRAKING SYSTEM WITH SKID CONTROL AND REDUNDANT POWER STEERING

BACKGROUND OF THE INVENTION

1. The Field of the Invention

This invention relates generally to a power braking system with skid control and more particularly relates to an integrated system wherein an auxiliary power source such as the power steering pump can be utilized for braking modes where the main source of power braking is unable to provide the required power.

2. The Prior Art

The prior art is represented by the copending application of Gilbert H. Drutchas, Ser. No. 829,551 filed June 2, 1969, now U.S. Pat. No. 3,588,193 issued June 28, 1971 wherein is disclosed a hydraulic skid control wherein hydraulic braking means apply a decel bias to the wheels of a vehicle and a wheel-driven pump generates a wheel feed hydraulic input. Control means suppress the decel bias with a controlled percent of wheel slippage and include a differential flow responsive bypass valve for reducing the hydraulic input as a function of flow and a variable orifice pressure-compensating valve for metering out the hydraulic input as a function of pressure.

SUMMARY OF THE INVENTION

In accordance with the principles of the present invention, a skid control pump driven as a function of rotational wheel speed is utilized as a primary source of hydraulic power and an engine-driven pump such as a power steering pump is used as an auxiliary power source. The hydraulic power is supplied to a hydraulic booster interposed between a master cylinder and an operator-actuated push rod. The hydraulic booster constitutes a plurality of valve elements including various lands and recesses controlling the application of hydraulic power to a master cylinder piston which, in turn, delivers pressurized fluid through a proportioning valve to the front and rear wheel brake motors of the vehicle. Upon pressure failure, the valve elements can be actuated to form a solid mechanical link between the push rod and the master cylinder piston for a fail-safe push-through operation. Further, the valve assembly of the hydraulic booster operates to transfer steering power requirements in the event of a failure of the power steering pump to the skid control pump and vice versa to transfer skid control power requirements in the event of a failure of the skid control pump to the power steering pump.

DESCRIPTION OF THE DRAWINGS

FIG. 1 is a somewhat schematic plumbing diagram illustrating a full power system embodying the principles of the present invention.

FIG. 2 is a schematic outline of the system provided in accordance with the principles of the present invention.

FIG. 3 is a sketch showing a relief bypass circuit which can be utilized in conjunction with the power steering pump.

FIG. 4 is a valve structure schematic illustrating the valve structure interposed between the steering gear and the two power sources, namely, the power steering pump and the skid control pump.

FIG. 7 is a view showing the passages formed in a manifold cover used on the power booster of FIG. 5.

FIG. 8 is a cross-sectional view taken on line VIII—VIII of FIG. 5.

FIG. 9 is a cross-sectional view taken on line IX—IX of FIG. 5.

FIG. 10 is a cross-sectional view taken on line X—X of FIG. 5.

FIG. 11 is a cross-sectional view taken on line XI—XI of FIG. 5.

BRIEF DESCRIPTION OF THE PREFERRED EMBODIMENTS

Figure 5:
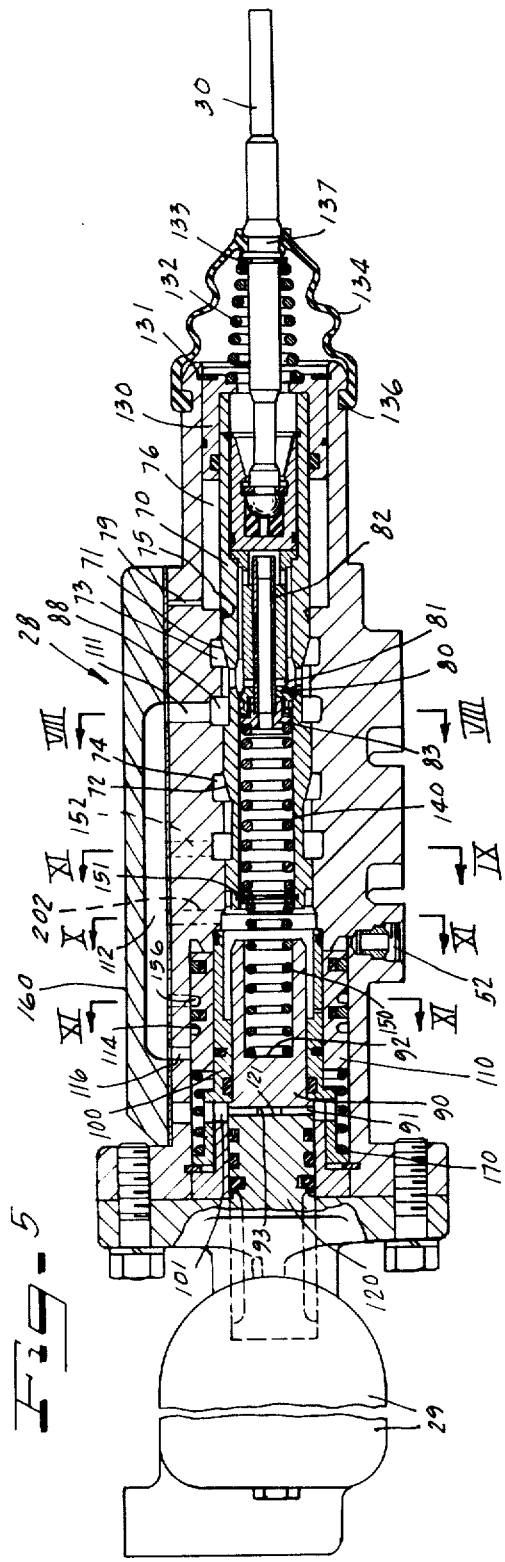
FIG. 5 is a cross-sectional view of the power booster provided in accordance with the principles of the present invention and with parts broken away.

The present invention contemplates a full power braking system for a wheeled vehicle having rear wheels 13 and 14 driven through a transmission including a propeller shaft 16 and a transmission extension housing 17. The rear wheels 13 and 14 have brake motor means shown at 18. Front wheels are provided at 19 and 20 and may be provided with separate brake motor means 21. It will be understood that the brake motor means 18 and 21 can be of any regularly used type such as disk brakes or drum brakes, or any other form of means for applying a decelerating bias or so-called decel bias to rotating wheels.

A skid control pump is shown at 22 and comprises a positive displacement pump adapted to be rotatably driven as a function of wheel rotation and therefore shown assembled to the transmission extension housing 17 so that a driven connection may be effected with the propeller shaft or some other rotatable part of the transmission reflecting the rotational speed of the rear wheels 13 and 14.

A power steering pump is shown at 23 and it will be understood that the power steering pump is an engine-driven pump, there being provided a pulley 24 by means of which the power steering pump may be rotatably driven by a fan belt.

The power steering gear by means of which power assistance is transmitted to the steering gear linkage is shown at 26 and a four-way valve mechanism closely associated with the power steering gear is shown at 27.

A hydraulic booster is shown generally at 28 and is interposed generally between a master cylinder 29 and a push rod 30 adapted to be actuated selectively by a vehicle operator by means of a foot pedal 31. An operating connection between the foot pedal 31 and the push rod 30 is shown schematically at 32. Hydraulic pressure delivered from the master cylinder is shown delivered to two separate delivery ports 33 and 34, it being understood that the braking motor systems are separated between the rear wheels and the front wheels. Accordingly, the conduit 36 associated with the port 33 leads to a proportioning valve 37 and a conduit 38 likewise leads to the proportioning valve 37. Hydraulic power is furnished respectively to the rear wheels and to the front wheels via corresponding conduit lines 39 and 40.

The skid control pump 22 may conveniently comprise a pump similar to that disclosed in copending application Ser. No. 829,551 filed June 2, 1969 and assigned to the same assignee as the present application. The discharge from the skid control pump 22 is directed through a conduit 41 to the four-way valve 27 of the steering gear 26 whereupon the fluid enters the hydraulic booster at 42 via a line shown at 43 and returns from the hydraulic booster 28 to the skid control pump 22 via a line 49.

The power steering pump 23 discharges through a discharge conduit 46 into the four-way valve 27 adjacent to and registering with the steering gear ports and then into the hydraulic booster 28 as at 47 via a line 45 and returns from an outlet 48 to the power steering pump 23 via a conduit 50.

A pressure reference line is also shown at 51 that communicates with raw pump pressure of the skid control pump, i.e., pressure ahead of a flow control orifice through which all of the skid control pump discharge is directed. The pressure reference line 51 is connected to the hydraulic booster 28 as shown at 52 and is connected to the skid control pump 22, as shown at 55.

In FIG. 2, the power steering pump 23 has been modified to include two pressure relief valves, a nominal outer valve 53 which by way of illustrative example might be set at 1,500 pounds per square inch and an inner relief valve 54 which might be at some higher value, for example, 2,000 pounds per square inch. The outer valve 53 may be of a full flow type and is connected by a conduit to an appropriate port of the power booster 28. Since the addition of the total drop of steering gear 26 and booster 28 is the pressure in the outlet port of the power steering pump 23, it is possible to demand pressures whose sum is greater than the power steering pump requirements.

Thus, as shown in FIG. 3, a relief bypass circuit permits an effective pressure of the sum up to the setting of the second relief valve 54, or with the examplary pressure values referred to, up to 2,000 pounds per square inch. Thus, as shown in FIG. 3, there is a variable hydraulic boost resistance identified at 56, which at its highest value, permits a nominal flow to circulate through the booster, and variable steering gear resistance shown at 57. The presence of nominal flow through the booster assures the availability of a flow work capability through the steering gear, when the power brake boost demand is at a maximum. It is also apparent that flow blocked at the steering gear resistance 57 will pass through the 1500 psi relief to the power steering throttle circuit.

The schematic diagram of FIG. 2 depicts a system used in combination with a valve to achieve power steering redundancy. The actual valving is shown somewhat schematically in FIG. 4, it being understood that the complete valve structure of FIG. 4 is interposed between the steering gear 26 and the two power sources, namely, the power steering pump 23 and the skid control pump 22.

The power steering pump 23, when operational, flows through a cavity 58, passage 59, orifice 60, through a line 61, through passage 62, through power steering open center spool 63, passage 64, line 66 and into the hydraulic booster power steering throttling port 47, through line 50 to a convenient reservoir 67.

At the time of a power steering pump failure, the orifice 60 no longer passes flow and, accordingly, a valve 68 closes off the line 69 to the governor circuit of the hydraulic booster 28 and switches the booster governor shift valve to open the power steering pump circuit to the pressure control chamber through the power steering throttling port 47. The action occurs in the following circuit sequence. Flow from the skid control pump 22 goes via a line 70, 71, through a cavity 72, a passage 59, the line 61, the passage 62, through the open center power steering gear valve 63, the passage 64 and the line 66 to the power steering throttling port 47 where the flow is throttled and passes through line 50 to sump 67 simultaneously creating a back pressure through the governor shift valve into the pressure control chamber.

Figure 6:
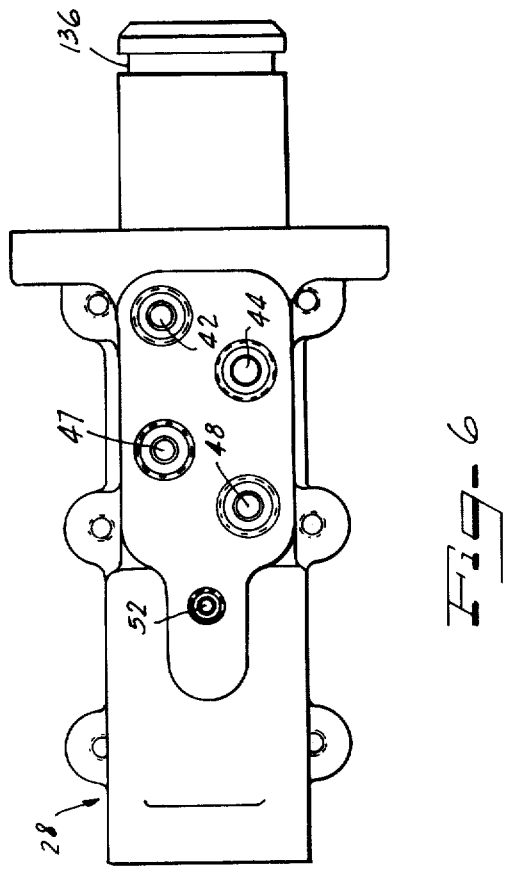
FIG. 6 is a bottom plan view of the booster of FIG. 5 but with parts removed.

Reference may now be made to FIGS. 5, 6 and 7 for an identification of the plural valve elements incorporated in the hydraulic booster 28. Moving from right to left, there is provided a throttle valve 70. Housed interiorly of the throttle valve 70 is a pressure-compensating valve shown generally at 80. A concentric valve is shown at 90 and moves within a valve sleeve 100. A governor shift valve 110 is disposed circumjacent the sleeve valve 100. A master cylinder piston is designated at 120.

At the far right-hand side of the booster 28, using the orientation of FIG. 5, a hold-off sleeve is shown at 130 and is normally pressure-loaded against a stop ring 131. A coil spring 132 is bottomed against the end of the hold-off sleeve 130 and is also operatively bottomed against the push rod 30 via an abutment ring 133. A dust cover or boot 134 snaps into a recess 136 formed in the booster housing and also snaps into a recess 137 formed in the push rod 30, thereby to enclose the end of the assembly.

The driver of the vehicle, or the operator, applies an actuating force to the push rod 30 via the brake pedal 31 and the actuating connection 32, thereby moving the throttling valve 70 to the left. It will be noted that the throttling valve 70 is specifically provided with tandem lands which are tapered and which are shown respectively in FIG. 5 at 71 and 72. The tapered lands are specifically provided to afford a virtual linear pressure build-up with main spool travel. Thus, the tapered lands 71 and 72 operate to simultaneously aid in unison close a port chamber 73 associated with the skid control pump via the inlet 42 and a port chamber 74 associated with the power steering pump inlet 47. Thus, pressure is generated in the port chambers 73 and 74 which is proportional to the force applied to the push rod 30.

The hold-off cylinder 130 is retained in position by the rising pressure generated in a cavity 76 emanating through a line 77 from the throttling chamber 74 via a line 78 through a port 79 to the cavity 76. In this manner, the force reaction on the coil spring 132 is supported and a total movement toward the left using the orientation of FIG. 5 is forestalled. It will be apparent that only a reduction in pressure to very low or zero values would permit the hold-off cylinder 130 to move along with the spring 132 and the throttle valve 70 when a fail-safe mechanical push-through action is desirable. At that time, the entire plurality of valve elements forms a solid mechanical link between the master cylinder piston 120 and the push rod 30.

The pressure compensating valve 80 is supported in an inner bore of the throttle valve 70 and includes a scanning annulus 81 which is aligned with a progression of openings formed in a center tube 82. The tube is pressed into the end of a retainer 83 bottoming one end of a coil spring 140. Thus, the pressure compensating valve 80 moves under the influence of the pressure generated by the proportional braking effort in the throttling port 73 of the skid control chamber. In the event of a road condition inducing a tendency towards skid, the system is set for the impending skid control action required. The spring 140 is the force reaction for the pressure-compensating valve spool or tube 82, while the spring shown at 150 bottomed on the opposite side of a stop 151 which also bottoms the opposite end of the spring 140, combines with the spring 132 to establish a total feel reaction of the brake booster, thereby affording brake pedal feel to the operator.

The concentric valve 90 is concentrically disposed in the valve sleeve 100 and is forced to the right, using the orientation of FIG. 5, under the influence of pressure forces generated in the pressure control chamber shown at 91. It will be noted that the concentric valve 90 has a cylindrical recess 92 formed therein bottoming the other end of the spring 150. Thus, the spring 150 reacting against the throttle valve 70 is maintained in a set position. The pressure in the pressure control chamber 91 is valved through the passages in a manifold cover 160 (FIG. 7) in accordance with the movement of the governor shift valve 110 bias position. The governor shift valve 110, during a proportional braking effort above a predetermined speed, for example, 7 miles per hour, is moved to the left and connects a passage 111 to line 112 and line 113 via the governor shift valve annulus shown at 114.

The governor shift valve 110, during a proportional braking effort above 7 miles per hour, is moved by the difference of pressure denoted as the difference between upstream and downstream dynamic drop in the flow control valve of the skid control pump 22. That pressure urges the governor shift valve 110 to bias against a spring 170, thereby opening the annulus 114 to the passage 116 and to line 113 to passage 117, line 112 and thence to passage 111 and cavity 88 which is at skid control pressure. A passage 101 connected to line 113 presents skid control pump pressure into the pressure control chamber 91 wherein it reacts against a valve face 93 of the concentric valve 90 and against a face or motive surface 121 of the master cylinder piston or plunger 120. The pressure proportionally generated on the surface 121 creates the force to move the master cylinder piston, thereby creating pressure at the wheel brake motors in a manner similar to conventional hydraulic braking systems. Due to separate interfaces on either side of the master cylinder 29, two separate fluids may be used in the described system. For example, it may be desirable to have conventional brake fluid in the lines from the master cylinder 29 to the brake motors 18 and 21 and type ATF fluid in the remainder of the system lines in front of the pressure control chamber 91.

The foregoing description has been with respect to what may be termed mode I, proportional braking above cut-off speed (for example 7 miles per hour) with or without skid control.

MODE II — Proportional Braking or Panic Braking Below Cut-Off Speed With or Without Skid Control The prevailing system operating means remains substantially similar to Mode I described hereinabove except that the pressure in the pressure control chamber 91 now becomes power steering pump pressure.

Since the governor shift valve 110 sensing a drop-off in speed at the cut-off point (such as 7 miles per hour) will shift to the right closing under the urging of spring 170, the transmission of hydraulic power to the pressure control chamber 91 now follows the path passage 152, to line 77 to passage 153, to line 154 and thence to the pressure control chamber 91 via passage 101. The hold-off cavity remains connected with the passage 152 and throttled power pump output through line 78 and passage 79.

Mode III — The Panic Brake Stop Skid Control Functioning

In this mode of operation, the driver applies force on the push rod 30. While the tandem throttling valve 70 closes the throttling ports 73 and 74, the pressure-compensating valve 80 starts to move off of its stationary position in which the scanning annulus 81, which is in register with "no hole opening," is biased by the rising pressure of the skid control pump 22. The pressure-compensating valve 80 increases its force on the spring 140 to the rear of the valve with a surge-like rise in pressure coupled with a leveling or controlling tendency. With a speed above the cut-off speed of 7 miles per hour, the path through the governor shift valve 110 to the pressure control chamber 91 is opened through the passage 111, line 77, passage 102, annulus 114, passage 116, and line 113. The skid control function operates in a manner described in detail in application Ser. No. 829,551 filed June 2, 1969. As described in that case, when the hydraulic braking means apply a decel bias to the wheels of the vehicle and the wheel-driven pump, i.e., the skid control pump 22 generates a wheel speed hydraulic input. Control means suppress the decel bias with a controlled percent of wheel slippage and includes a differential flow responsive bypass valve for reducing the hydraulic input as a function of flow and a variable orifice pressure-compensating valve 80 for metering out the hydraulic input as a function of pressure. During this time a normal brake pedal feel is noted with the hold-off cavity 76 being pressurized from the power steering pressure via the passage 152, line 78, passage 79 and cavity 76.

Mode IV — Power Failure in Power Steering Pump Circuit During Skid Control or Below Cut-Off Speed In this mode, it is contemplated that there might be a power failure in the power steering pump circuit during skid control or below the cut-off speed. It will be appreciated that no effect would be noted above the cut-off speed.

The governor shift valve 110, biased by the dynamic drop across the skid control orifice, stays open until the wheel speed drops to the cut-off speed, or using the figure herein cited as exemplary, 7 miles per hour. The pressure drops in the hold-off cavity 76 and a slight change in brake feel may be noted by the operator. Pressure in the pressure control chamber 91 continues to remain adequate above the cut-off speed or 7 miles per hour.

At or below 7 miles per hour, the pressure in the pressure control chamber 91 drops and the concentric valve 90 cannot maintain its static position. The pressure force working on the valve face 93 is in a degraded condition and can no longer hold back the "train forces" arising from the spring 140 and the tandem throttling valve 70. Thus, the concentric valve 90 will move to the left using the orientation of FIG. 5. That motion produces a chain reaction with the push rod 30 carrying the spring 132, the hold-off cylinder 130, the tandem throttling valve 70, the spring 140 and the concentric valve 90 in translation until a solid train is created with the faces of the concentric valve 90 and the master cylinder, i.e., the valve face 93 and the piston face 121, in intimate contact. That mechanical link can be referred to as a "fail-safe push-through."

Mode V — Failure of Skid Control Pump During a Proportional or Skid Control Stop Above or Below the Cut-Off Speed Above or below the cut-off speed herein cited as 7 miles per hour, the governor shift valve 110 would be in the closed position, i.e., the dynamic drop across the skid control pump orifice would not be of sufficient pressure to keep the governor shift valve 110 open. Therefore, the throttled power steering output from the port 74 would register through the passage 152, line 77, passage 102, passage 116, passage 153 and line 154 to the pressure control chamber 91.

Mode VI — A Secondary Failure Consequence Governor Shift Valve Stuck in the Open Position With Or Without a Skid Control Pump Failure Due to the blockage of the normal fail-safe pathway of the throttle power steering pump output through passage 152, line 77, passage 102, annulus 116, passage 153 and line 154 to the pressure control chamber 91, the only available braking means is achieved by manual push through. To achieve such manual push through, force is applied manually to the push rod 30. Since pressure in the control chamber 91 is degraded, the concentric valve 90 moves a slight distance to the left, the push rod force cannot be sustained, and spring 140 pushes out on the concentric valve 90 while the tandem throttle valve 70 also moves to the left unable to maintain the force from the push rod 30. The slight motion of the tandem throttle valve 70 opens a notch 75 to atmospheric pressure bilking the pressure generated from the power steering pump throttling effect and releasing the "chain reaction" where the push rod 30 carries the spring 132, the hold-off cylinder 130, the tandem throttle valve 70, the spring 140 and the concentric valve 90 until a solid train is created with the faces 93 and 121 in intimate contact. Thus, as referred to previously, a solid mechanical link is provided for a fail-safe push-through action.

Mode VII — In the Parking Condition Power "Brake Pressure Reduction" to Braking System and Power Steering Demand at Speeds Above the Cut-Off Speed Since the system depicted represents a series drop configuration, i.e., a pressure drop through the steering gear 26 and the hydraulic booster 28, a special provision for effectively handling such contingency is provided as previously described in connection with FIGS. 2 and 3.

The governor shift valve 110 has a bleed egress line 155 to passage 156 to drain which lines up with the governor shift valve 90 annulus 156, thereby limiting the pressure build up on the power steering throttle port 74 to a nominal value, using the exemplary pressures mentioned hereinabove, such as 400 pounds per square inch. That allows added pressure and flow capacity for steering at idle by limiting the pressure build-up potential of the throttle port 74 in the hydraulic booster 28. Thus, gear catch-up at idle is reduced.

Still another salient feature of the double relief is the "above cut-off operation." When power steering and brake boost demands are equal or less than 1,500 psi, the power steering pump relief operates at 1,500 psi, reducing load on the power steering pump 23. On the other hand, when power booster demands from the power steering pump 23 are high, as exemplified in the case of a failure of the skid control pump 22, where the sum total of each demand may go up to 2,000 psi, power steering is given preference under such conditions and a second stage relief is used to limit the peak pressure to 2,000 psi. At the time of a gear "open center blockage," the 1,500 psi relief valve 53 discharges its bypass into the hydraulic booster 28 to provide continuous flow for power boost.

By virtue of the present invention, complementary power braking is provided in conjunction with controlled slip. The objectives of the present invention are accomplished by a two-port concept utilizing primary and secondary port modulation means and attaining the advantages of a redundant power source through the use of the power steering pump customarily provided on many vehicles as a matter of standard equipment. Thus, in accordance with the present invention, a series of valving structures provided by the hydraulic booster 28 permit each basic function to act cooperatively in a manner to attain skid control, power braking, a redundant power braking effort and a mechanical push-through back-up.

It will be understood that this description may be supplemented by making reference to the acknowledged co-pending application Ser. No. 829,551 filed June 2, 1969 wherein the structure and function of slip control accomplished with the combination of a pressure-compensating valve and a throttling valve with a skid control pump discharging through an orifice are detailed. In this connection it may be noted that a metering-out passage is shown in this disclosure at 200 (FIG. 10) communicating with a line 201 and a passage 202 leading to the hollow interior spaces of the valve elements in the booster.

Although various minor modifications might be suggested by those versed in the art, it should be understood that we wish to embody within the scope of the patent warranted hereon, all such modifications as reasonably and properly come within the scope of our contribution to the art.

We claim:

1. A unitary assembly integrating two braking functions comprising,
   an operator-actuated master cylinder for selectively generating braking pressure,
   a rotary skid control pump operable as a function of rotational wheel speed forming a power source for generating braking pressure,
   a rotary power steering pump forming an auxiliary power source for braking modes when the skid control pump is unable to provide the required power,
   and a valving means having a tandem throttle valve for regulating the application of pump-generated power to the braking motors in response to actuation of the master cylinder and including additional valving means to transfer the acting power source from one pump to the other.

2. In combination,
   braking motor means,
   a first pump operable as a function of rotational wheel speed and constituting a skid control pump,
   a second pump constituting a power steering pump and forming an auxiliary power source to back up the skid control pump,
   a master cylinder having a push rod adapted to be actuated selectively by an operator,
   and a hydraulic booster having valving means operated by said push rod including a tandem throttle valve operable to control the flow of fluid from said first and second pumps to supplement master cylinder pressure,
   said valving means operable to transfer steering power requirements to the skid control pump in the event of a failure of the power steering pump.

3. For use in a hydraulic skid control system,
   a power booster comprising,
   a tandem spool-type throttle valve adapted to be actuated by a master cylinder push rod and having a pair of tapered lands cooperable with a primary port and a secondary port, respectively, and operable to close said ports in unison,
   thereby to provide a virtual linear pressure build-up upon axial movement of the spool.

4. A power booster for a braking system with skid control comprising,
   a valve body having a valve bore extending therethrough and further including a manifold formed with passages and lines and a manifold cover therefor,
   a master cylinder having a master cylinder plunger operable upon actuation thereof to transmit pressure to the brake motors of a wheeled vehicle,
   a power source for transmitting pressure generated externally to said valve body thereby to supplement pressures acting on said master cylinder plunger,
   a plurality of valve elements in said valve bore to control the application of said pressure as a function of desired wheel slip,
   and a push rod adapted to be actuated by an operator and forming together with said valve elements a solid mechanical train link for fail-safe push-through operation of said master cylinder plunger.

5. An hydraulic booster for a skid control braking system comprising,
   hydraulic braking means including a master cylinder having a piston for supplying hydraulic pressure to the brake motor means of a vehicle,
   a push rod having actuating means for receiving operator input whenever braking is desired,
   valve means interposed between said master cylinder piston and said push rod,
   a skid control pump driven as a function of rotational wheel speed for generating a primary hydraulic input to said valve means,
   and a power steering pump driven as a function of engine speed for generating an auxiliary hydraulic input to said valve means for use in the event of failure of said skid control pump, said valve means comprising a throttle valve for throttling the supply of liquid to pressure load the master cylinder piston.

6. An hydraulic booster as defined in claim 5 and further characterized by said throttle valve having a spool formed with tapered lands and cooperable with an adjacent port to provide a virtual linear pressure build-up with spool travel.

7. Valve means for interposition between a master cylinder piston and an operator-actuated push rod comprising,
   a tandem throttle spool valve having two tapered spool sections controlling a primary port and an auxiliary port receiving hydraulic fluid respectively from a primary source and an auxiliary source,
   whereby the tapered spool sections provide a virtual linear pressure build up of hydraulic input with axial adjustment of the spool,
   and a pressure-compensating valve supported in an inner bore of said throttle spool valve for metering out the hydraulic input as a function of pressure, thereby to provide controlled slip when the hydraulic fluid pressure is used for braking the wheels of a vehicle.

8. In combination with a wheeled vehicle, a rotary pump forming a braking power source and having a driven connection to rotate in unison with the wheels of the vehicle,
   said pump having an inlet and an outlet and a bypass passage therebetween,
   means forming a discharge orifice through which all of the liquid pumped is discharged,
   a flow regulating valve of the differential type in control of said bypass passage and operable as a function of the pressure drop across said orifice,
   hydraulic braking means receiving liquid under pressure from said pump for selectively applying a deceleration bias to the wheels of the vehicle,
   a throttle valve for throttling the supply of liquid to the hydraulic braking means as a function of wheel speed,
   and a pressure-compensating valve to meter out liquid from the supply of liquid directed to the hydraulic braking means as a function of pressure,
   thereby inducing rotational slippage of the wheels in an optimum controlled range,
   a power steering system for the vehicle including a power steering pump,
   and valving means for utilizing said power steering pump as an auxiliary braking power source when said rotary pump is unable to provide the required power.

9. In combination with a wheeled vehicle as defined in claim 8,
   said valving means including means to permit said rotary pump to supply power steering requirements in the event of failure of said power steering pump.

10. An hydraulic skid control comprising,
    hydraulic braking means for applying a decel bias to the wheels of a vehicle,
    a wheel-driven pump for generating a wheel feed primary hydraulic input,
    an engine-driven pump for generating an auxiliary hydraulic input,
    control means for suppressing the decel bias with a controlled percent of wheel slippage, said control means comprising valving means for reducing said hydraulic input as a function of flow, said valving means further comprising a variable orifice pressure-compensating valve for metering out said hydraulic input as a function of pressure and for using the auxiliary power source when the wheel-driven pump is unable to provide the required hydraulic input.

11. In combination with a wheeled vehicle, means forming a closed hydraulic circuit,
a positive displacement pump at one point in said circuit,
wheel-actuated driving means for driving said pump and pressurizing the liquid to develop a wheel feed input for said circuit which is related to rotational wheel speed,
master cylinder piston means at a second point in said circuit receiving liquid from said pump to apply a decel bias to the wheel braking motors,
and decel bias suppression means to control the slip of the wheels at a regulated percent with respect to wheel speed,
an engine-driven power steering pump for the vehicle,
a push rod adapted to be actuated by an operator,
and means to utilize said power steering pump as an auxiliary braking power source comprising valving means interposed between said master cylinder piston and said push rod and disposed to be actuated thereby for selectively supplying hydraulic input to the master cylinder piston, said valving means forming a solid mechanical link for push-through operation of said master cylinder piston in the event of a pressure failure.

12. The method of skid control in a wheeled vehicle which includes the steps of driving liquid through a closed circuit in the form of a stream,
at one point in the circuit pressurizing the liquid with a wheel-driven pump driven as a function of rotational rate of speed of the wheels,
at a second point in the circuit utilizing the pressurized liquid to generate and apply pressure to a master cylinder piston which in turn will apply a decel bias to the wheels selectively to decelerate the vehicle as a function of the pump-generated pressure,
at a third point in the circuit metering out liquid supplied to said second point as a function of both pressure and flow, thereby to suppress the decel bias to a preselected lesser value so that the decel bias is maintained at a level below that necessary to lock the wheels,
pressurizing a source of hydraulic liquid with an engine-driven pump to form an auxiliary source of pressurized liquid,
and utilizing the auxiliary source for braking modes when the wheel-driven pump is unable to provide the required power.

* * * * *